Feb. 21, 1967 R. C. STADDEN 3,305,429
NONWOVEN FABRIC WITH FOAM BINDER
Filed Jan. 25, 1963
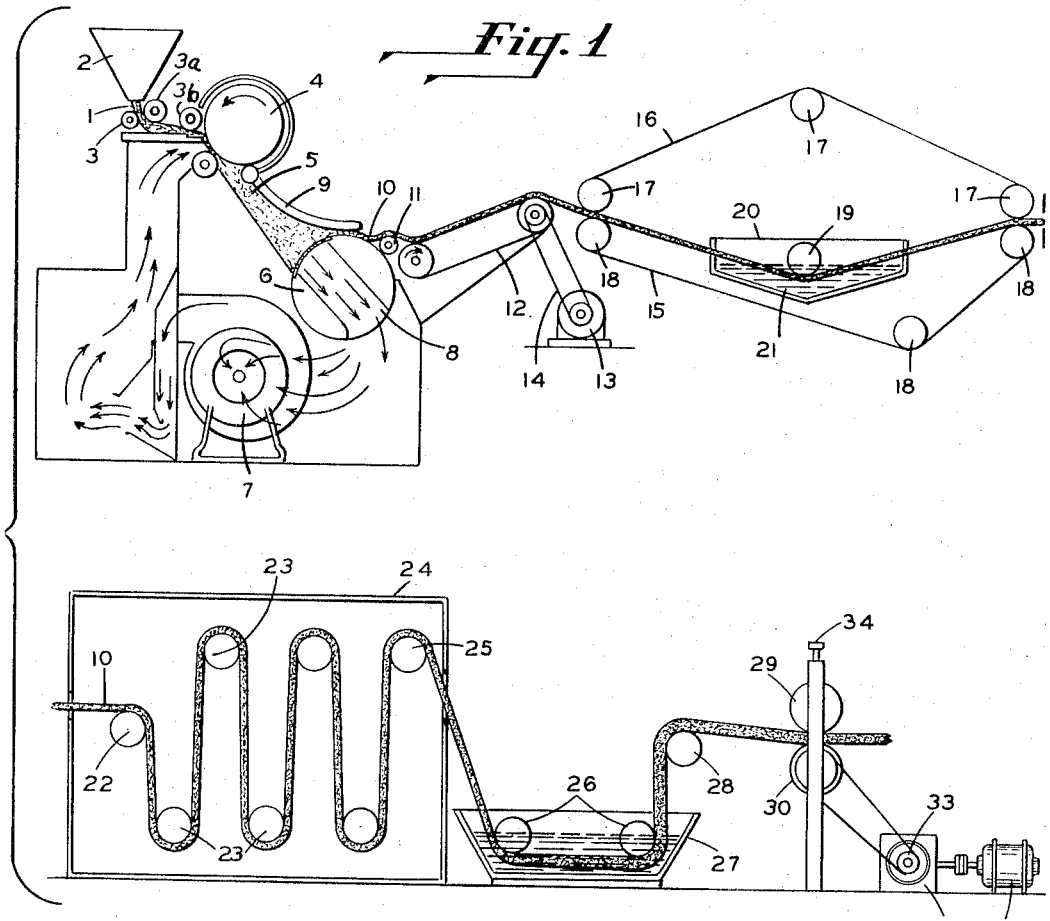
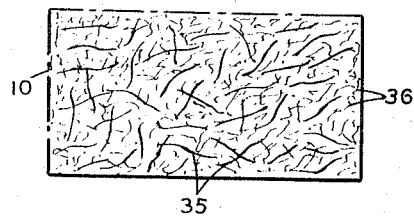
Fig. 2
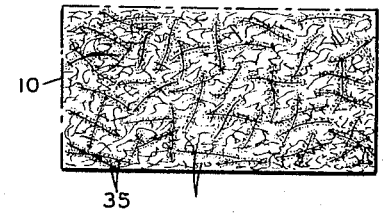
Fig. 4
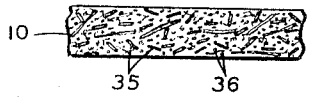
Fig. 3
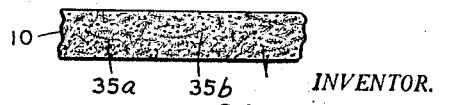
Fig. 5
INVENTOR.
RICHARD C. STADDEN
BY
George L. Harr

United States Patent Office 3,305,429
Patented Feb. 21, 1967

3,305,429
NONWOVEN FABRIC WITH FOAM BINDER
Richard C. Stadden, 2247 Manor Ridge Drive, Manor
Township, Lancaster County, Pa. 17603
Filed Jan. 25, 1963, Ser. No. 253,849
4 Claims. (Cl. 161—169)

This invention relates to nonwoven fibrous products having a reinforced foam thermoplastic binder. More particularly, this invention relates to nonwoven fibrous products and the method of making them wherein either natural or synthetic nonfoamable fibers or a combination of both are combined with expandable thermoplastic fibers and are randomly dry formed into a web which is subsequently steeped in a solvent-expanding agent for the thermoplastic fibers to expand surface portions thereof and bind the natural or synthetic fibers. The term "fibers" as used herein with relation to the thermoplastic material is meant to include fibers per se as well as very thin ribbon-like strips and other thin elongated shapes which may be round, rectangular, square, irregular, etc., in cross section.

This method makes it possible to form in a continuous manner a foam-bound fibrous product having a mechanical interlocking feature provided by the unfoamed core of the foam-surfaced thermoplastic fibers. This method also provides a means of controlling the degree of foaming of the thermoplastic material, as well as the density of the foam portions. The product produced by this method has a unique cushioning feature not found in nonwoven fibrous articles made by prior art processes.

It has been the custom in the past to produce nonwoven fibrous sheets or webs by first air or water laying the fibers at random in all directions to lie in completely overlapping intersecting relationship in a loose mat or web. The mat or web was then normally supplied with at least one of several types of bonding agents to anchor the individual fibers together to form a more or less self-sustaining web. Prior methods of incorporating a foamable material in such a mat of nonwoven fibers included impregnating methods such as dipping the mat in a dispersion of the potentially foamable material, spraying the foamable material throughout the mat, or including the foamable material in the mat in powdered form. The mat or web was then heated to cause foaming of the expandable material around the fibers.

Numerous disadvantages attended these prior processes. For example, a dry-formed random fibrous sheet had to be first supplied with a binder to hold it together, and the binder had to be dried before the mat could be handled. Subsequent, even and thorough impregnation of the mat by dipping it in a liquid, foamable resin required much care to control the amount of absorption of foamable resin into the sheet. Inclusion of the foamable resin in powdered form in a bound mat involved the difficulty of having the powder segregate out in the handling of the mat causing subsequent, uneven density of the foamed material throughout the mat. It has also been proposed in U.S. Patent 2,879,197 to eliminate the use of an adhesive binder and utilize a foamable resin as a binder for the fibers of the mat by lightly spraying the liquid foamable resin onto the fibers in an amount sufficient to lightly coat them, after which the mat is heated to a temperature below the foaming temperature of the resin but sufficient to dry the resin to a nontacky state. This method of applying the foamable resin is more readily controllable than the aforementioned processes and has the added advantage, upon heating of the mat, of producing a foaming action which takes place substantially simultaneously throughout the fibers. However, before the mat has been bonded by drying the foamable resin, care must be taken to prevent matting or compression of the fibers. This is particularly true at the time the mat is impregnated with the foamable resin.

It has long been desired to find a relatively simple and effective method of forming a nonwoven fibrous product having an easily regulated amount of uniformly distributed cellular binding material, the foam density of which could be easily controlled and which would not only provide resilience and softness to the fibrous body but also provide increased structural reinforcement thereto.

It is an object of this invention to provide a simple, continuous method of forming a nonwoven fibrous article having a foamed binder. It is a further object to provide a method for forming a nonwoven fibrous article having a reinforced foam supporting binder. A still further object is to provide a method for controlling the amount of foaming and the density of the foamed binder in a nonwoven foam-bound fibrous article. Another object is to provide a method for making a nonwoven fiber article having foamable thermoplastic supporting fibers uniformly distributed throughout the volume thereof. An additional object is to provide a controlled steeping method for providing foam-surfaced thermoplastic supporting elements having unmodified cores in a nonwoven fibrous article. Another object is to provide a method for forming a nonwoven fibrous article comprising a mixture of natural and/or synthetic fibers and interlocking foam-surfaced thermoplastic fibers.

These objects are realized by the present invention which, briefly stated, comprises dry foaming a random mat made up of a combination of natural and/or nonfoamable synthetic fibers and thermoplastic resin fibers, conveying the mat between foraminous belts to a steeping bath where the confined web is steeped in a liquid-expanding agent which is absorbed into the thermoplastic resin component but does not completely penetrate the entire thickness thereof. After removing the confined web from the steeping bath it is passed through a drying area. The mat is then exposed to heat such as a hot water bath or a convection oven. At this point the portion of the thermoplastic resin component containing the expanding agent foams and provides a strong binding action on the nonfoamable fibers and additionally provides a mechanical interlocking action on the structure by virtue of the unmodified strengthening central portion of the thermoplastic fibers.

Mats made in accordance with the present invention have a wide variety of uses as cushioning materials, filters, insulating materials and the like. The relative rigidity or resiliency of the pad may be varied as desired upon proper selection of steeping time, concentration of expanding agent, temperature and the type and ratio of foamable fibers to nonfoamable fibers employed in the mat.

A preferred illustrative method of constructing an article in accordance with the present invention and which incorporates the above-mentioned advantages is shown in the accompanying drawings in which FIGURE 1 is a diagrammatic illustration of an apparatus used in carrying out the process of this invention;

FIGURE 2 is a diagrammatic top plan view of the randomly dry-formed fibrous web of this invention before steeping or foaming;

FIGURE 3 is an enlarged elevational view of an edge portion of the sheet shown in FIGURE 2;

FIGURE 4 is a diagrammatic top plan view of the finished reinforced foam-bound nonwoven sheet; and FIGURE 5 is an enlarged elevational view of an edge portion of the finished sheet of FIGURE 4.

Referring to the drawings, one form of an appropriate apparatus for carrying out the invention is diagrammatically shown in FIGURE 1 of the drawings. This apparatus consists of four basic sections, a combination feeding and web-forming section, a steeping bath, a section for surface drying and penetration of the expanding agent, and a foaming section consisting of a hot water bath. Exposure times in each of the last three sections are independently adjustable for any given line speed.

In FIGURE 1, a mixture of foamable and nonfoamable fibers 1 which may be cellulose acetate and polystyrene, for example, is fed from a combination mixing and feeding device exemplified by the hopper 2. The fiber lap is fed by feed rolls 3, 3a and 3b to a lickerin roll 4 which separates the fibers and passes them to a duct 5. The fibers are drawn through the duct 5 and deposited on a condenser roll 6 by means of an air current generated by fan 7 and passing through the duct 5 and opening 8 in the condenser roll 6. A duct cover 9 is provided on duct 5 and is adjustably spaced away from the condenser roll 6 a distance equal to the desired thickness of the randomly formed dry fibrous web 10. The web 10 is drawn from condenser roll 6 over roll 11 by a delivery conveyor 12 which is driven by motor 13 through a drive arrangement 14.

As the base material for an article made according to the invention there is employed natural or synthetic filler fibers of staple lengths which preferably are crimped, etc. We have found that satisfactory fibers are synthetic fibers such as nylon, rayon, cellulose acetate, acrylic fiber (formed from a polymer of acrylonitrile) commercially available under the trademark "Orlon," vinylidene chloride-vinyl chloride copolymer fiber commercially available under the trademark "Saran," and the like. Inorganic fibers such as glass fiber, commercially available under the trademark "Fiberglas," may also be used as may metal fibers, natural fibers such as wool, cotton, wood fiber, animal hair, or vegetable fibers such as jute or sisal. The above fibers may be used alone or mixed with each other. The foamable thermoplastic fibers which may be used in forming the nonwoven fibrous article of this invention may comprise polystyrene, modified polystyrene materials, that is, any material having a polystyrene base with additives to change certain physical or chemical properties without changing the basic nature of the polystyrene. In addition to polystyrene and its copolymers, other foamable materials usable in making the article of this invention may include, for example, methacrylate polymers, cellulose acetate butyrate, polycarbonates and poly(vinyl butyral).

The natural or synthetic fibers used may be of various lengths, ranging preferably from ½" to 3". The foamable thermoplastic component is preferably but not necessarily in the form of very thin ribbons which are about ½" to 3" in length, 1/64" to 1/8" in width and .0005" to .005" thick. The nonfoamable synthetic or natural fibers and the foamable thermoplastic fibers may be combined in ratios in the range of from about 90% nonfoamable fibers to 10% foamable thermoplastic fibers, to about 50% of each. In one embodiment of the invention, the nonfoamable fibers used are 35 denier cellulose acetate and the thermoplastic foamable material is in the form of ribbons measuring about 2" x 1/32" x .003". The ribbons were cut from a .003" thick sheet of polystyrene. The ribbons and fibers were mixed in a fiber blending machine in a ratio of 75 parts filler fiber and 25 parts foamable binder ribbons and formed into a mat in an intermingled random arrangement on a webbing machine of the type made by the Curlator Corporation, East Rochester, New York. Forming the mat in this manner uniformly distributes the thermoplastic component throughout its volume. The mat is then confined between upper and lower foraminous conveyor belts and passed into a steeping medium containing a liquid solvent-expanding agent for the thermoplastic component of the mat. The mat remains in the steeping medium just long enough for the solvent-expanding agent to penetrate the surface of the thermoplastic material to a predetermined depth, but in no case is the penetration complete. The mat then passes out of the steeping medium and is dried and exposed to heat to soften and cause foaming of the portion of the thermoplastic component containing the solvent-expanding agent. The foam forms around the nonfoamable fibers, and the unmodified core of the foamed material provides a mechanical binding action not found in other prior articles of this type.

The web 10 is delivered by conveyor 12 to foraminous confining and conveying belts 15 and 16 which are driven by conventional drive means, not shown. These belts are entrained over rolls 17 and 18, respectively, and pass under adjustable guide roll 19 located in the steeping tank 20 where it is subjected to the action of a solvent-expanding agent 21 which may be, for example, monofluorotrichloromethane. The lentgh of time of immersion of the fibrous sheet in the solvent-expanding agent is proportional to the desired depth of penetration of the solvent-expanding agent into the thermoplastic component of the web. Optimum times and ranges will be discussed below. However, it may be said here that the exposure time is relatively short as compared to the steeping time employed in conventional bead steeping; for example, the time being in the order of a few seconds to several minutes.

The action of the solvent-expanding agent on the thermoplastic component of the web causes these fibers to become sufficiently tacky to bind the filler fibers therebetween and render the web self-supporting enough to be passed through the following drying and expansion processes. After immersion, the web carrying the solvent-expanding agent passes out of the steeping bath and over adjustable guide roll 22 and festooning rolls 23 located in the drying chamber 24. A period of a minute or more is allowed for penetration and drying of the web in its passage therethrough. As the web leaves the drying chamber it passes over guide roll 25 and under guide rolls 26 located in the hot water expansion tank 27. It is here that the surface of the thermoplastic fibers containing the solvent-expanding agent are expanded into a spongy, cellular or porous material. The foam-bound web then passes over guide roll 28 and through squeeze rolls 29 and 30 which are driven by a motor 31 through a gear reduction unit 32 and a belt and pulley arrangement 33. These squeeze rolls serve a three-fold purpose. They squeeze out some of the water, they have a pressure adjustment 34 to permit control of thickness and density of the web, and they transmit the drive force to the web. The foam-bound web is then cooled, after which the foam-bound fibrous web may be fabricated into the desired articles. Various fabricating operations may be performed on the web to adapt it for the use desired. For example, it may be run through fluting rolls to provide a corrugated structure for use as packings, etc.

As diagrammatically shown in FIGURE 2 and to an enlarged scale in FIGURE 3 of the drawings, the thermoplastic fibers 35 are randomly dispersed among the nonfoamable fibers 36 in the dry-formed sheet or web 10. This relatively simple and efficient method of uniformly distributing a nonsegregating foamable strengthening and binding material throughout a nonwoven fibrous web is an important feature of this invention. This method eliminates many prior difficulties experienced in forming an article of this type, such as matting of the fibers upon application of a liquid binder, uneven distribution of the foamable material, segregation of the foamable material when included in the fibrous web in powdered form.

The finished reinforced foam-bound nonwoven fibrous sheet of this invention as diagrammatically shown in FIGURE 4, and to an enlarged scale in FIGURE 5, shows the thermoplastic fibers 35 of the sheet 10 after expansion. As can be seen more clearly in FIGURE 5, the thermoplastic fibers 35 have an unmodified inner core 35a and an outer foamed surface 35b. The foamed outer surfaces 35b of the thermoplastic fibers 35 serve as a binder for the nonthermoplastic fibers and the inner unmodified portion 35ª of the fibers 35 provides a strengthening feature which results in unique cushioning properties not found in other articles of this type.

The new features of the improved method of this invention may also be utilized in the forming of variously shaped articles by noncontinuous methods. For example, the treated fibrous sheet of this invention could be cut to pieces of appropriate size and contour and formed over or in a perforated mold in a manner well known in the art, prior to the expansion step to make shaped cushioning members for packaging articles, etc.

With regard to the thickness of the thermoplastic sheet which may be used in forming the fibers or ribbons used in this invention, it has been found that a starting thickness in the range of from .0005" to .005" have produced the best results.

The rate of absorption of the thermoplastic fibers or ribbons usable in this invention can also be controlled through; (1) modification of the sheet from which the fibers or ribbons are made by use of fillers or nucleating agents, (2) leaching out of internally dispersed, soluble, incompatible substances, (3) through incorporation of an inert fibrous matrix, (4) through a mechanical means such as perforation or knurling of a surface of the sheet from which the thermoplastic ribbons are made, and (5) through altering the temperature of the web containing the thermoplastic fibers or ribbons prior to immersion. It is important to note here that the thickness of the foamed surfaces and the unmodified inner portion as well as the density of the foamed portions may be easily controlled through regulation of certain critical variables in the steep-expansion process.

When the foam-bound web of this invention is made in a continuous process, a combination of solvent-expanding agents may be used to shorten the time necessary for the thermoplastic material to absorb sufficient expanding agent to result in the desired end product. A variety of aliphatic and two aromatic hydrocarbon systems have been found to produce a foam by the steep-expansion method. In the interest of safe handling, however, chlorinated systems have received chief emphasis. Best results with polystyrene have been attained using combinations of trichloromonofluoromethane, boiling point 74.8° F., and methylene chloride, boiling point 104.3° F. Optimum level for the trichloromonofluoromethane is 90 to 100% of the total by weight. Although 100% of either component will produce a foam, methylene chloride alone tends to produce a very coarse celled, blistered structure due to excessive solvent action. The purpose of the minor constituent is to increase the solvency of the system thereby accelerating its absorption into the thermoplastic fibers. Therefore, a measure of control over absorption or steeping time lies in regulation of the ratio of trichloromonofluoromethane to methylene chloride.

Alternate liquid-expanding agents which either alone or in mixtures have been found to foam polystyrene are: petroleum ether, pentane, hexane, heptane, acetone, ethyl acetate, methyl ethyl ketone, methyl chloroform, carbon tetrachloride, trichloroethylene, ethyl ether, isopropyl ether, benzene, and cyclohexane.

As previously stated, the depth of expanding agent penetration into the polystyrene fibers is proportional to steep time. For example, immersion time for 5-mil thick fibers using a 95:5 ratio of trichloromonofluoromethane to methylene chloride can range from a quick dip to approximately 45 seconds. Beyond this time the fibers dissolve to the point where they are not usable in this invention. In the above solution a 10-second dip at 70° F. will result in approximately 20% thickness penetration into the fibers. Thus, with a 5 mil starting thickness a 3-mil thick unfoamed core remains after expansion.

It has been found that optimum results with the 95:5 trichloromonofluoromethane-methylene chloride system have been attained when the temperature of the steeping bath has been kept between 68° F. and 74° F. The rate of absorption is considerably retarded below 68° F., and above 74° F. excessive evaporation occurs.

While control of the drying and penetration time occurring between the steeping bath and the expanding hot water bath is not highly critical, the optimum time for these thin sheets has been found to be 120 seconds. If the elapsed time between these two points is too low, surface blister formation and a superficial foam layer may result. If the time is extended beyond 3 minutes, excessive penetration occurs and the core is lost. The resulting product is entirely different from the one with which this invention is concerned.

The following examples will further illustrate the invention, but the invention is not limited to these examples. All parts and percentages are by weight unless otherwise specified.

*Example 1*

A fibrous web having a reinforced foam binder was formed by immersing a web of 75% filler fibers and 25% of .003" thick polystyrene ribbons in a steeping bath of trichloromonofluoromethane and 5% methylene chloride at a temperature of 70° F. for a period of 11 seconds. The web containing the solvent-expanding agent was then removed from the steeping bath and allowed to dry for 2 minutes at 77° F. to complete the desired penetration of the solvent-expanding agent into the thermoplastic fibers in the web. The web was then immersed for 10 seconds in a bath of boiling water at which time the thermoplastic component of the web became soft and pliable and foaming of the portion of the thermoplastic fibers containing the expanding agent took place. The web was removed from the expanding bath and passed between squeeze rolls and dried. The resulting foam-bound fibrous sheet was considerably reinforced by the unmodified center core portion of the thermoplastic fibers and the web had a unique cushioning effect and a low density not normally found in sheets of this type.

*Example 2*

A nonwoven, foam-bound fibrous web was formed by immersing a dry-formed random fibrous web consisting of 75% cotton fibers and 25% ribbons of polycarbonate resin in a 50:50 solution of trichloromonofluoromethane and methylene chloride at a temperature of 70° F. for 10 seconds. After removal from the solution, the web was allowed a 2-minute period for drying and sufficient penetration of the solvent-expanding agent into the thermoplastic ribbons. The web is then heated in an oven at 350° F. for 5 minutes to foam the portion of the ribbons penetrated by the solvent-expanding agent. The web is then ready for fabrication into the desired articles.

*Example 3*

A foam-bound fibrous web was formed by laying a random web of a mixture of 75% cotton fibers and 25% of fibers of cellulose acetate butyrate in a steeping bath of a 50:50 solution of petroleum ether and methyl ethyl ketone at 77° F. for 2 minutes. The web was removed from the bath and a 2-minute period was allowed for drying and completion of penetration of the solvent-expanding agent into the thermoplastic component after which the web was immersed in boiling water for 10 seconds. The resulting reinforced foam-bound sheet was passed through squeeze rolls to eliminate some of the water, increase the density of the sheet and provide a compacted resilient product well adapted to be fabricated into packings, etc.

I claim:

1. A method of forming a nonwoven fibrous web having a foam binder in the form of foam-surfaced fibers distributed and intermingled throughout said web comprising the steps of:

forming a nonwoven web of a mixture of randomly disposed fibers, said mixture comprising foamable thermoplastic fibers which are capable of absorbing a subsequently applied solvent-expanding agent therefor intermingled with fibers which are unaffected by said solvent-expanding agent, conveying said nonwoven web to a steeping bath containing a solvent-expanding agent for said foamable thermoplastic fibers, steeping said web in the solvent-expanding agent for a period of time sufficient to allow partial penetration of said agent into said foamable thermoplastic fibers, removing said web from said steeping bath, drying said web, and exposing said web to heat to cause expansion of the treated portions of said foamable thermoplastic fibers.

2. A method in accordance with claim 1 in which said mixture of fibers is comprised of 50% to 90% by weight of fibers which are unaffected by said solvent-expanding agent and 50% to 10% by weight of foamable thermoplastic fibers which are capable of absorbing said solvent-expanding agent.

3. A method in accordance with claim 2 in which said nonwoven web is positioned between foraminous confining means during said steeping step.

4. A nonwoven fibrous article comprising a mixture of randomly disposed intermingled fibers, said mixture containing 50% to 90% by weight of nonfoamable fibers and 50% to 10% by weight of partially foamed thermoplastic fibers, each of said foamed thermoplastic fibers having a foamed surface and an unmodified central core, said foam-surfaced fibers being dispersed throughout said fibrous article and serving as a reinforced foam binder therefor.

References Cited by the Examiner

UNITED STATES PATENTS

| | | | |
|---|---|---|---|
| 2,862,284 | 12/1958 | Wiczer | 161—180 X |
| 2,879,197 | 3/1959 | Muskat et al. | 161—159 X |
| 3,026,272 | 3/1962 | Rubens et al. | 264—53 |

JOSEPH H. STEINBERG, *Primary Examiner.*

EARL M. BERGERT, ALEXANDER WYMAN, L. T. PIRKEY, R. A. FLORES, *Assistant Examiners.*